United States Patent [19]

Sutton

[11] 4,264,146
[45] Apr. 28, 1981

[54] FOLDING LASER MIRROR

[75] Inventor: George W. Sutton, Lexington, Mass.

[73] Assignee: Avco Everett Research Laboratory, Inc., Everett, Mass.

[21] Appl. No.: 111,548

[22] Filed: Jan. 14, 1980

[51] Int. Cl.³ .......................... G02B 7/18; G02B 5/08
[52] U.S. Cl. .................................................. 350/310
[58] Field of Search ........................................ 350/310

[56] References Cited

U.S. PATENT DOCUMENTS

| | | |
|---|---|---|
| 3,637,296 | 1/1972 | McLafferty et al. ................ 350/310 |
| 3,645,608 | 2/1972 | Staley et al. ......................... 350/310 |
| 3,708,223 | 1/1973 | Sorenson et al. ................... 350/310 |
| 3,731,992 | 5/1973 | Mansell ................................ 350/310 |
| 3,861,787 | 1/1975 | Locke et al. ......................... 350/310 |
| 3,884,558 | 5/1975 | Tobin et al. .......................... 350/310 |
| 3,926,510 | 12/1975 | Locke et al. ......................... 350/310 |
| 3,942,880 | 3/1976 | Zeiders, Jr. .......................... 350/310 |

*Primary Examiner*—Jon W. Henry
*Attorney, Agent, or Firm*—Melvin E. Frederick

[57] ABSTRACT

A laser mirror adapted to prevent astigmatism of reflected laser beams where the mirror is used for "folding" the laser beam such that the incident laser beam direction is not normal to the reflective surface of the mirror. This is accomplished by the provision of slots of specified dimensions in the rear surface of the mirror that in use are disposed parallel to the major axis of the laser beam's image on the mirror. In this manner, the mirror is provided with two bending stiffnesses, one in the direction of the major axis that is greater than that in the direction of the minor axis such that the bending due to heating of the mirror in the direction of both axes is made at least substantially equal.

11 Claims, 2 Drawing Figures

U.S. Patent      Apr. 28, 1981      4,264,146
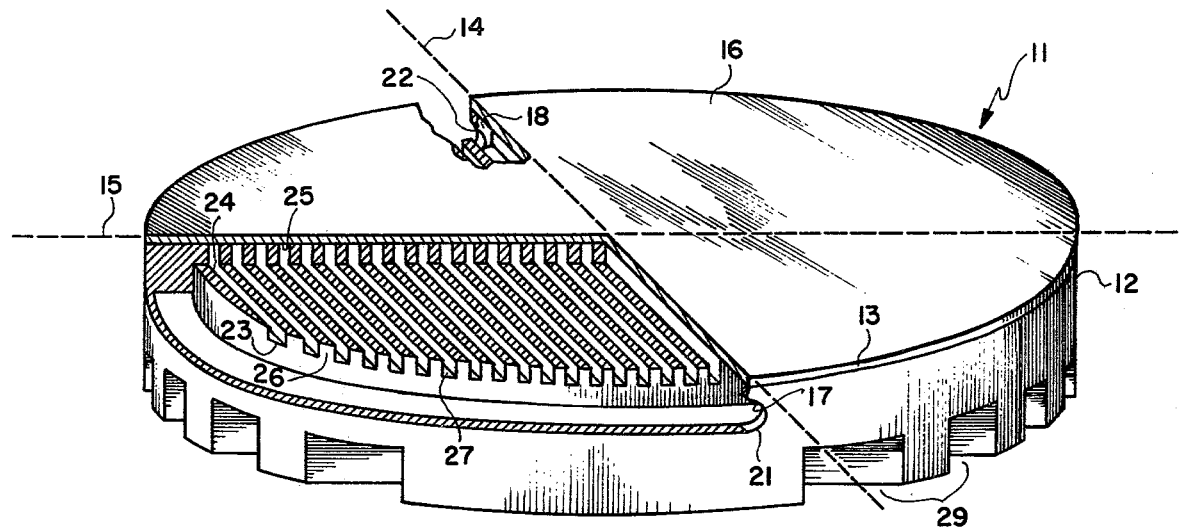
_Fig 1_
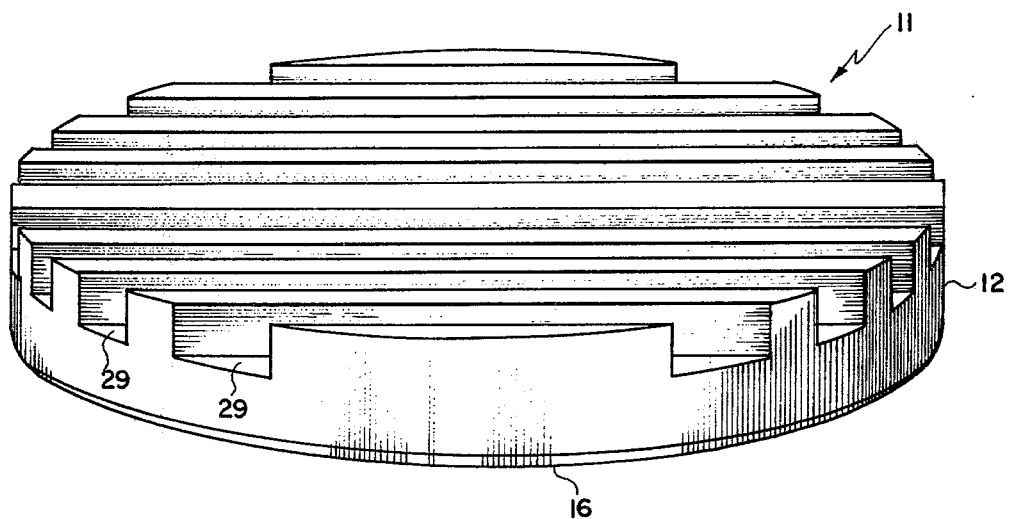
_Fig 2_

FOLDING LASER MIRROR

BACKGROUND OF THE INVENTION

This invention relates to laser mirrors and more particularly to laser mirrors subject to thermal distortion and arranged and adapted to resist thermal distortion detrimental to laser action.

In the field of lasers, it has long been known that the alignment and optical figure of the mirrors are of critical importance in order to maintain maximum output. Frequently, laser mirrors after being correctly aligned and particularly mirrors used in chemical reaction and gas lasers wherein they are exposed to high energy laser beams as well as hot gases as described above, are subjected to heating which cause misalignment and distortion.

If one surface of a laser mirror is exposed to a uniform heat flux resulting, for example, from radiative and/or aerodynamic heating, conduction produces a temperature gradient in the material normal to its exposed surface. In the absence of external restraint, the differential thermal expansion results in spherical bending. Where a high quality optical system is required or desired, surface distortion should not be greater than a small fraction of the wavelength of the radiation of, for example, about 10% at the most. In certain gas laser systems, distortion should be kept at a value less than preferably one, or at most, several microns. Gas lasers such as, for example, gas dynamic and electrically pumped $CO_2$ lasers are capable of extremely high output powers if mirror distortion does not limit obtainable power output.

Water cooled mirrors are commonly used to direct high energy laser beams. The laser beam incident on its water cooled front face causes a temperature rise of the front face which causes it to thermally expand. The back member of the mirror is made stiff to resist the bending caused by the expansion of the front face. However, the back is not infinitely stiff and, consequently, the mirror bends into a convex shape. For an incident laser beam whose energy absorbed by the mirror is azimuthally uniform, the shape of the bent mirror has no azimuthal distortion when the beam is normally incident to the mirror. A laser beam which is both azimuthally and radially uniform in absorbed intensity on the mirror will bend the mirror into a paraboloid, which requires only refocus correction.

However, if such a water cooled mirror is used for "folding" the laser beam, such that the incident beam direction is no longer normal to the surface, then the mirror will introduce astigmatism into the reflected beam. This can be exemplified by considering as an example a circular beam of uniform intensity, which is to be redirected at an angle of 90°. This requires the mirror to be placed at an angle of 45° to the laser beam. Normally, such a mirror is elliptical in cross section with the operative length of the mirror axis at least equal to the beam diameter, and the major axis at least equal to $\sqrt{2}$ times the beam diameter. In this case, the mirror distortion due to thermal bending is a paraboloid of revolution. The mirror bending distortion is proportional to square of the distance from the center of the mirror; and the optical wave front error is likewise proportional to the square of the distance measured from the center of the beam. Since the beam shape on the mirror is elliptical, the distortion at the major axis is greater than at the mirror axis. Since they are not equal, the reflected beam is astigmatic.

SUMMARY OF THE INVENTION

A mirror in accordance with the present invention in a simple and economical manner prevents astigmatism of laser beams reflected from mirrors, sometimes referred to as folding mirrors, which are used to direct the laser beam. This is accomplished by the provision of slots of specified dimensions in the rear surface of the mirror that in use are disposed parallel to the major axis of the laser beam's image on the mirror. In this manner, the mirror is provided with two bending stiffnesses, one in the direction of the major axis that is greater than that in the direction of the minor axis such that the bending of the mirror in the direction of both axes is made at least substantially equal.

BRIEF DESCRIPTION OF THE DRAWINGS

FIG. 1 is a perspective view with a portion broken away of a mirror in accordance with the invention; and FIG. 2 is a bottom view of the mirror of FIG. 1.

DESCRIPTION OF THE PREFERRED EMBODIMENT

The laser folding mirror 11 shown in FIGS. 1 and 2 includes a solid rear portion 12 and a plate-like face portion 13. For convenience, the mirror 11 is shown as generally elliptical in shape since the folding of a circular laser beam is assumed and the cross section of the image of such an off-axis laser beam on a folding mirror is generally elliptical in shape. Broadly, although a generally elliptical shape is preferred, the mirror may have any reasonable shape so long as its dimensions are acceptably greater than those of the incident laser beam. The mirror minor or first axis 14 and the major or second axis 15 are shown in FIG. 1 and lie in the plane of the reflective surface 16.

The rear portion 12, preferably formed of a stiff material with low thermal expansion coefficient, is relatively thick and substantially inflexible as compared to the plate-like face portion 13, which is preferably formed of a material of high thermal conductivity such as copper. Provided in the rear portion 12 are separate slot-like coolant manifolds 17 and 18. Each manifold has the same radius, is located adjacent the outer edge of the rear portion and extends substantially through an arc of 180°. A passage or coolant port 21 extends in a radial direction within the rear portion and connects the midpoint of the manifold 17 with the exterior of the rear portion. A passage or coolant port 22 extends in a radial direction within the rear portion and connects the midpoint of manifold 18 with the exterior of the rear portion. These passages or coolant ports 21 and 22 are positioned at diametrically opposed locations.

Coolant channels 23 are formed in the forward surface 24 of the rear portion. This surface 24 is shaped to receive the rear surface 25 of the plate-like face portion 13. The channels 23 may be, for example, rectangular in cross section with the webs 26 being formed therebetween. The channels 23 are positioned in parallel relationship one with another with one end of each channel being in communication with the manifold 17 at its inner surface 27, and the other end of each channel being in communication with the other manifold at its inner surface 28 (not shown).

While a plurality of parallel coolant flow channels have been shown for receiving a coolant from one of the manifolds and exhausting it to the other manifold to remove heat from the mirror as a result of impingement of a laser beam on the reflective surface 16, it is to be understood that other means and arrangements deemed suitable may be used as the invention is not limited to any particular arrangement for removal of heat by the coolant. It is only necessary that the rear portion of the mirror be substantially inflexible as compared to the front or face portion and that it be in substantially fixed relationship to the face portion. Alternate mirror configurations for beneficially effecting removal of heat are shown, for example, in U.S. Pat. Nos. 3,645,608; 3,926,510; and 3,942,880.

Provided in the rear surface of the rear portion are a plurality of parallel grooves 29 extending the length of the mirror in the direction of and parallel to the major axis 15. The grooves 29 as more fully disclosed hereinafter have a depth and spacing one from another whereby in use the degree of bending (as distinguished from stiffness) in the direction of the two axes are made substantially equal. The grooves 29 function to change the bending stiffness of the mirror so that there are two different bending stiffnesses; one for bending in the direction of the major axis and one for bending in the direction of the minor axis. For a water cooled mirror with a solid rear portion 12 as shown in FIGS. 1 and 2, the bending resistance is proportional to the cube of the thickness of the mirror; but the bending moment caused by thermal heating of the face portion is proportional to the thickness of the mirror so that distortion is proportional to the square of the thickness of the mirror.

It is necessary that when mounted for use, a mirror in accordance with the invention must be oriented with respect to an incident off-axis laser beam (not shown) such that the major axis 15 and, hence, grooves 29 be in planes parallel with the plane containing the longitudinal axis of the laser beam.

A folding laser mirror arranged and adapted as described above will be less stiff to bending in the direction of the minor axis. Thus, the minor axis can bend more and its bending can be made equal to the bending of the major axis if, for redirection of a laser beam at an angle of 90° for example, the thickness of the metal remaining between the bottom of the grooves and the reflective surface is about $1/\sqrt{2}$ of the original or maximum thickness of the mirror. The bending distortion will then have no azimuthal asymmetry with respect to the reflected laser beam, and astigmatism of the reflected laser beam will be prevented. For folding at angles other than 90°, a simple rule is that the ratio of remaining metal to the original thickness shall equal the reciprocal of the cosine of the angle of incidence $\theta$ of the laser beam as measured from the direction normal to the reflecting surface. Further, the spacing of the grooves one from another should not be substantially less than the depth of the grooves.

Alternatively, strips of metal may be fastened to the back of a mirror such that the ratios of the section structural moment of inertia divided by the distance from the heating face portion to the neutral plane of bending, is equal to the square of the cosine of the angle of incidence.

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims.

I claim:

1. In a mirror for use in a laser, the combination comprising:
   (a) a face portion having an exposed optically reflective substantially planar surface, a first axis and a second axis perpendicular to said first axis, said first and second axes lying in the plane of said reflective surface;
   (b) a rear portion having a rear surface remote from said reflective surface, said rear portion being substantially inflexible as compared to said face portion and in substantially fixed relationship to said face portion; and
   (c) means for removing heat from said face portion, said rear surface having a plurality of grooves parallel to said second axis of such depth and spacing one from another whereby for heat input to said face portion, the degree of bending of said mirror normal to the direction of said first axis is substantially equal to the degree of bending of said mirror normal to the direction of said second axis.

2. A mirror as defined in claim 1 wherein the depth of said grooves is substantially $h(\sqrt{2}-1)$ where h is the distance between said reflective surface and said rear surface.

3. A mirror as in claim 1 wherein the depth of said grooves is substantially $$h\left(\frac{1}{\cos\theta} - 1\right)$$

where h is the distance between said reflective surface and said rear surface and $\theta$ is the angle of incidence of a laser beam incident on said reflective surface.

4. A mirror as in claim 3 wherein the spacing of said grooves one from another is not substantially less than the depth of said grooves.

5. A mirror as defined in claim 3 wherein said face and rear portions are comprised of different materials, said face portion having a high thermal conductivity and said rear portion having a low thermal expansion coefficient.

6. A mirror as in claim 1 wherein the ratio of the distance between the bottom of said grooves and said reflective surface to the distance between said reflective surface and said rear surface is substantially equal to the reciprocal of the cosine of the angle of incidence of a laser beam on said reflective surface.

7. In a folding mirror for use in a laser, the combination comprising:
   (a) a face portion having an exposed optically reflective substantially planar surface, a minor axis and a major axis perpendicular to said minor axis, said minor and major axes lying in the plane of said reflective surface;
   (b) a rear portion having a rear surface remote from said reflective surface, said rear portion being substantially inflexible as compared to said face portion and in substantially fixed relationship to said face portion; and
   (c) means for removing heat from said face portion, said rear surface having a plurality of grooves parallel to said major axis of such depth and spacing one from another whereby for heat input to said mirror through said reflective surface from a laser beam, the angle of incidence of which with said reflective surface is not ninety degrees and is substantially parallel to said grooves, the degree of bending of said mirror normal to the direction of said minor axis is substantially equal to the degree of bending of said mirror normal to the direction of said major axis.

8. A mirror as in claim 7 wherein the depth of said grooves is substantially $$h\left(\frac{1}{\cos\theta} - 1\right)$$

where h is the distance between said reflective surface and said rear surface and $\theta$ is the angle of incidence of a laser beam incident on said reflective surface.

9. A mirror as defined in claim 8 wherein said face and rear portions are comprised of different materials, said face portion having a high thermal conductivity and said rear portion having a low thermal expansion coefficient.

10. A mirror as in claim 9 wherein the operative dimension of said reflective surface along said second axis is greater than the operative dimension along said minor axis.

11. A mirror as in claim 9 wherein the spacing of said grooves one from another is not substantially less than the depth of said grooves.

* * * * *